United States Patent [19]

Kodama et al.

[11] Patent Number: 5,346,638
[45] Date of Patent: Sep. 13, 1994

[54] OXIDE MAGNETIC MATERIAL

[75] Inventors: Takashi Kodama, Nagaokakyo; Yasunobu Yoneda, Takefu, both of Japan

[73] Assignee: Murata Manufacturing Co., Inc., Japan

[21] Appl. No.: 120,945

[22] Filed: Sep. 14, 1993

[30] Foreign Application Priority Data

Sep. 14, 1992 [JP] Japan ................................ 4-271177

[51] Int. Cl.$^5$ .............................................. C04B 35/28
[52] U.S. Cl. ................................ 252/62.59; 252/62.56; 252/62.6; 252/62.64
[58] Field of Search .................. 252/62.56, 62.59, 62.6, 252/62.64

[56] References Cited

U.S. PATENT DOCUMENTS

| | | | |
|---|---|---|---|
| 2,565,111 | 8/1951 | Schoenberg | 252/62.6 |
| 2,656,319 | 10/1953 | Berge | 252/62.59 |
| 3,450,635 | 6/1969 | Izergina et al. | 252/62.59 |
| 3,574,116 | 4/1971 | Sugano et al. | 252/62.59 |

FOREIGN PATENT DOCUMENTS

| | | | |
|---|---|---|---|
| 676062 | 12/1963 | Canada | 252/62.64 |
| 48-5559 | 2/1973 | Japan | 252/62.59 |
| 59-121806 | 7/1984 | Japan | 252/62.59 |
| 625256 | 8/1978 | U.S.S.R. | 252/62.59 |

*Primary Examiner*—Jack Cooper
*Attorney, Agent, or Firm*—Ostrolenk, Faber, Gerb & Soffen

[57] ABSTRACT

An oxide magnetic material comprises a basic composition consisting essentially of 45.0 to 49.0 mol % of $Fe_2O_3$, 3.0 to 9.0 mol % of MgO, 1.0 to 4.0 mol % of CuO, 0.1 to 1.5 mol % of $Bi_2O_3$, and the balance of NiO and additives, and contains, as additives, $SiO_2$ and $Co_3O_4$ incorporated in the basic composition in an amount of 0.1 to 0.5 wt % of $SiO_2$ and 0.05 to 0.35 wt % of $Co_3O_4$.

1 Claim, 3 Drawing Sheets

OXIDE MAGNETIC MATERIAL

BACKGROUND OF THE INVENTION

1. Field of the Invention

The present invention relates to an oxide magnetic material used for cores of chip coils and, more particularly, an oxide magnetic material which enables to produce chip coils with low loss at high frequencies of not less than 100 MHz and small temperature coefficient of inductance (L).

2. Prior Art

Recently, with the improvement in the precision of the electronic devices and the increase in operating frequencies thereof, the requirements for characteristics electronic parts are strict recently. In particular, wound chip coils, which have been used widely in amplifier circuits and oscillation circuits of electronic devices such as image processing devices and communication devices, are required to have high Q at high frequencies of 100 MHz and above. Also, the chip coils are required to have a temperature coefficient of inductance L ranging from 0 to 750 ppm/° C. since capacitors used in combination with the chip coils have a temperature coefficient of capacitance ranging from −750 to 0 ppm/° C.

On the other hand, ferrite materials such as Ni-Mg-Cu-Bi ferrites have been developed as a material for magnetic cores used for high frequency chip coils, and the chip coils having a high value of Q at high frequencies have received practical application.

However, such chip coils involves some problems awaiting a solution. For example, the chip coils comprising a Ni-Mg-Cu-Bi ferrite core have the temperature coefficient of inductance (L) ranging from 1000 to 2000 ppm/° C. Thus, if such a chip coil is used in combination with a capacitor of which the temperature coefficient of capacitance ranges from −750 to 0 ppm/° C., the resultant circuit will have a positive temperature coefficient as a whole. Such a problem would be overcome by employing chip coils having a temperature coefficient of inductance ranging from 0 to 750 ppm/° C. and capable of being used even at high frequencies of 100 MHz and above.

However, there is no ferrite material suitable for production of chip coils having a small temperature coefficient of inductance ranging from 0 to 750 ppm/° C. and capable of being used even at high frequencies of 100 MHz and above.

SUMMARY OF THE INVENTION

It is therefore an object of the present invention to provide an oxide magnetic material suitable as a material for magnetic cores of chip coils, that enables to produce chip coils having a small temperature coefficient of inductance (L) ranging from 0 to 750 ppm/° C. and having high Q even at high frequencies of 100 MHz and above.

According to the present invention, the above object is achieved by incorporating a suitable amount of additives $SiO_2$ and $Co_3O_4$ into a basic composition of a Ni-Mg-Cu-Bi ferrite consisting of $Fe_2O_3$, MgO, CuO, $Bi_2O_3$ and NiO.

According to the present invention, there is provided an oxide magnetic material consisting essentially of a basic composition of a Ni-Mg-Cu-Bi ferrite system and additives incorporated therein, said basic composition consisting essentially of 45.0 to 49.0 mol % of $Fe_2O_3$, 3.0 to 9.0 mol % of MgO, 1.0 to 4.0 mol % of CuO, 0.1 to 1.5 mol % of $Bi_2O_3$, and the balance of NiO, said additives consisting essentially of 0.1 to 0.5 wt % of $SiO_2$ and 0.05 to 0.35 wt % of $Co_3O_4$.

The oxide magnetic material according to the present invention makes is possible to produce chip coils which is small in loss at high frequencies, has a small temperature coefficient of inductance ranging from 0 to 750 ppm/° C. and high Q at high frequencies of 100 MHz and above.

EXAMPLE 1

Highly purified powders of $Fe_2O_3$, MgO, CuO, $Bi_2O_3$ and NiO were weighed and mixed to prepare a mixture for a basic composition consisting of 47.5 mol % of $Fe_2O_3$, 47.5 mol % of NiO, 4.5 mol % of MgO, 2.0 mol % of CuO, and 0.5 mol % of $Bi_2O_3$. Then, the mixture for basic composition was added with powders of $SiO_2$ and $Co_3O_4$ in proportions as shown in Table 1, in which added amounts of the additives $SiO_2$ and $Co_3O_4$ are expressed in percent by weight and asterisked specimens are those out of the scope of the present invention.

TABLE 1

| No. | *1 | 2 | 3 | 4 | 5 | 6 | *7 | *8 | *9 | *10 | *11 |
|---|---|---|---|---|---|---|---|---|---|---|---|
| $SiO_2$ | 0.0 | 0.1 | 0.2 | 0.3 | 0.4 | 0.5 | 0.6 | 0.7 | 0.8 | 0.9 | 1.0 |
| $Co_3O_4$ | 0.1 | 0.1 | 0.1 | 0.1 | 0.1 | 0.1 | 0.1 | 0.1 | 0.1 | 0.1 | 0.1 |

The resultant mixture was calcined at 900° C. for 2 hours, put into a polyethylene pot along with suitable amounts of distilled water and agate balls, and milled for 24 hours. Then, the resultant slurry was added with a suitable amount of an organic binder (usually, polyvinyl alcohol), milled for 2 hours, and then granulated by spray-drying. The granules was compacted and then fired at 1050° C. for 2 hours to prepare cores for chip coils.

Using the resultant cores, there were prepared chip coils by winding 5 turns of a conducting wire with a 0.1 mm$\phi$ diameter round each core. For each chip coil, measurements were made on the temperature coefficient of inductance, L, at temperatures ranging from −25 to 85° C. The results are shown in FIG. 1 as a function of the content of $SiO_2$.

Figure 1:
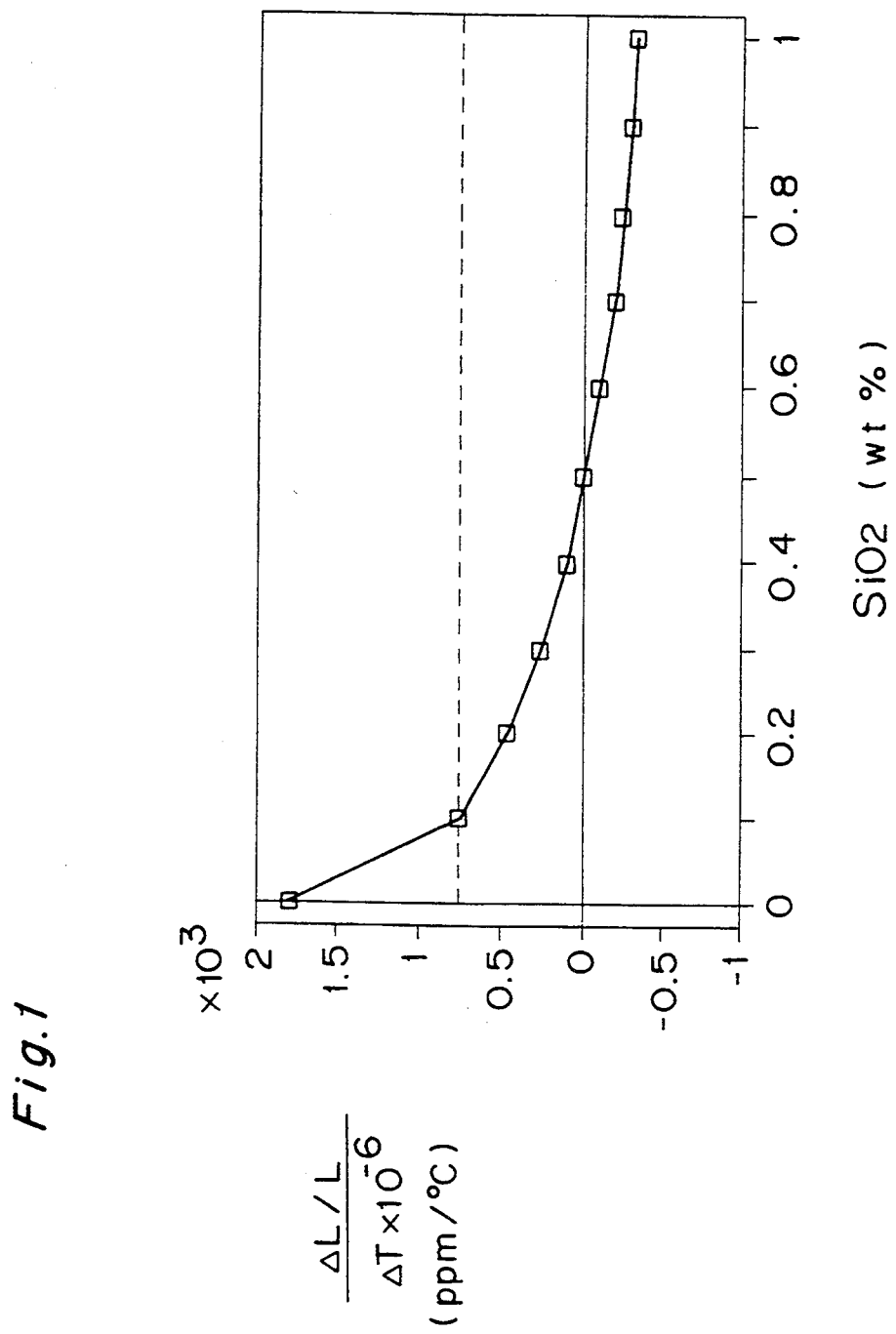
FIG. 1 is a graph illustrating relation between the temperature coefficient of inductance and the content of $SiO_2$ in a magnetic core of a chip coil, the core being made of an oxide magnetic material according to the present invention.

As will be understood from the results shown in FIG. 1, the temperature coefficient of L exceeds 750 ppm/° C. when the content of $SiO_2$ is less than 0.1 wt %, but it decreases with increasing content of $SiO_2$. However, if the content of $SiO_2$ exceeds 0.5 wt %, the temperature coefficient of L becomes a negative value. For these reasons, the $SiO_2$ content in the ferrite has been limited to 0.1 to 0.5 wt %.

EXAMPLE 2

Highly purified powders of $Fe_2O_3$, MgO, CuO, $Bi_2O_3$ and NiO were weighed and mixed to prepare a mixture for a ferrite composition consisting of 47.5 mol % of $Fe_2O_3$, 45.5 mol % of NiO, 4.5 mol % of MgO, 2.0 mol % of CuO, and 0.5 mol % of $Bi_2O_3$. The resultant mixture was added and mixed with $SiO_2$ and $Co_3O_4$ in proportions as shown in Table 2 in which added amounts of the additives $SiO_2$ and $Co_3O_4$ are expressed in percent by weight and asterisked specimens are those out of the scope of the present invention.

TABLE 2

| No. | *12 | 13 | 14 | 15 | 16 | 17 | 18 | 19 | *20 | *21 | *22 |
|---|---|---|---|---|---|---|---|---|---|---|---|
| $SiO_2$ | 0.2 | 0.2 | 0.2 | 0.2 | 0.2 | 0.2 | 0.2 | 0.2 | 0.2 | 0.2 | 0.2 |
| $Co_3O_4$ | 0.00 | 0.05 | 0.10 | 0.15 | 0.20 | 0.25 | 0.30 | 0.35 | 0.40 | 0.45 | 0.50 |

The resultant mixture was calcined at 900° C. for 2 hours, put into a polyethylene pot along with suitable amounts of distilled water and agate balls, and then milled for 24 hours. The resultant slurry was granulated with an organic binder by spray-drying after mixing them for 2 hours. The granules were compacted into cores for chip coils and then fired at 1050° C. for 2 hours.

Figure 2:
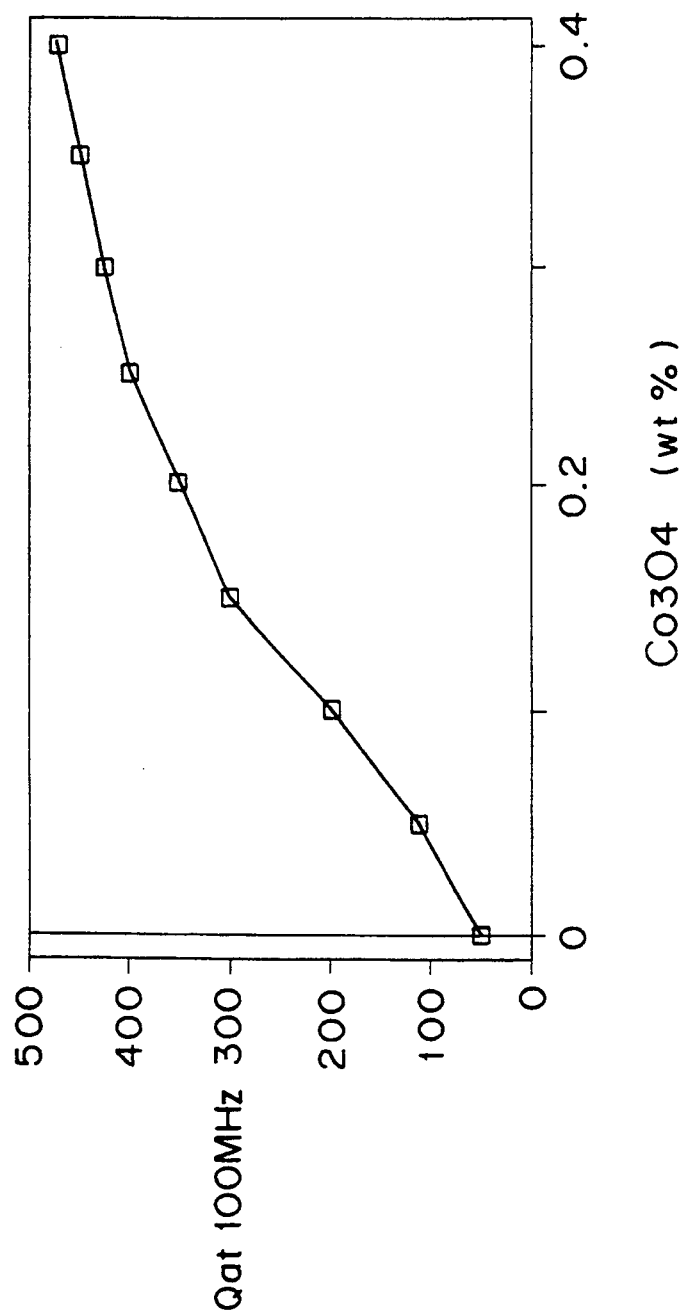
FIG. 2 is a graph illustrating relation between Q and the content of $Co_3O_4$ in a magnetic core of a chip coil, the core being made of an oxide magnetic material according to the present invention.
Figure 3:
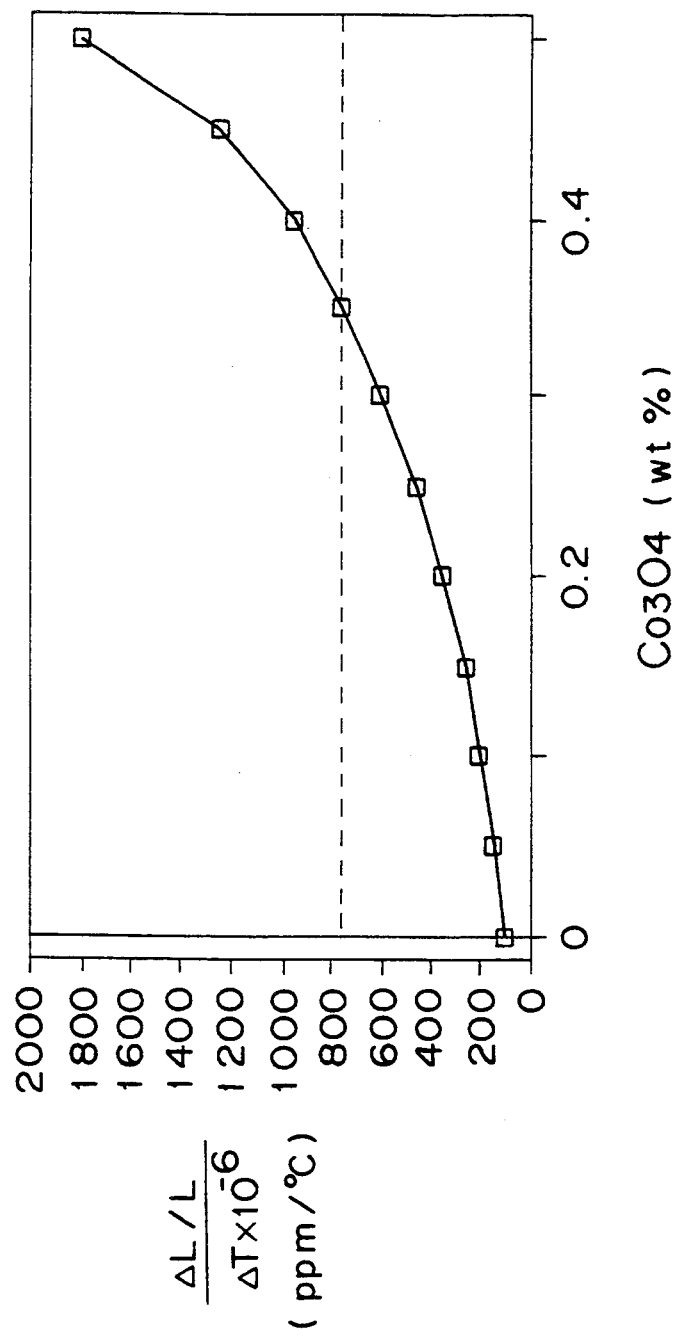
FIG. 3 is a graph illustrating relation between the temperature coefficient of inductance and the content of $Co_3O_4$ in a magnetic core of a chip coil, the core being made of an oxide magnetic material according to the present invention.

Using the resultant cores, there were prepared chip coils by winding 5 turns of a conducting wire with a 0.1 mm$\phi$ diameter round each core. For each chip coil, measurements were made on Q at 100 MHz with a commercially available impedance analyzer. The results are shown in FIG. 2 as a function of the content of $Co_3O_4$. Also, the temperature coefficient of inductance L was measured for each specimen at temperatures ranging from −25 to 85° C. The results are shown in FIG. 3 as a function of the content of $Co_3O_4$.

As can be seen from the results shown in FIG. 2, the Q of the chip coils is smaller than 100 if the content of $Co_3O_4$ in the ferrite core is less than 0.05 wt %. If the content of $Co_3O_4$ in the ferrite core exceeds 0.05 wt %, the Q of the chip coils becomes greater than 100 and increases with the content of $Co_3O_4$. However, the maximum content of $Co_3O_4$ in the ferrite core is limited to 0.35 wt % as the temperature coefficient of inductance becomes greater than 750 ppm/° C. if the content of $Co_3O_4$ exceeds 0.35 wt %, as illustrated in FIG. 3. For these reasons, the content of $Co_3O_4$ has been limited to a value in the range of 0.05 to 0.35 wt %.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An oxide magnetic material consisting essentially of a basic composition of a Ni-Mg-Cu-Bi ferrite and additives incorporated therein, said basic composition consisting essentially of 45.0 to 49.0 mol % of $Fe_2O_3$, 3.0 to 9.0 mol % of MgO, 1.0 to 4.0 mol % of CuO, 0.1 to 1.5 mol % of $Bi_2O_3$, and the balance of NiO, said additives consisting essentially of 0.1 to 0.5 wt % of $SiO_2$ and 0.05 to 0.35 wt % of $Co_3O_4$, and exhibiting a temperature coefficient of inductance in the range of 0–75 ppm/° C.

* * * * *

UNITED STATES PATENT AND TRADEMARK OFFICE
CERTIFICATE OF CORRECTION

PATENT NO. : 5,346,638
DATED : September 13, 1994
INVENTOR(S) : Takashi KODAMA AND Yasunobu YONEDA, both of Japan It is certified that error appears in the above-indentified patent and that said Letters Patent is hereby corrected as shown below:

Title page, Item 73, please change:

"Assignee: Murata Manufacturing Co., Inc.
Japan"

to read

--Assignee: Murata Manufacturing Co., Ltd.
Japan--

Signed and Sealed this

Second Day of May, 1995

Attest:

BRUCE LEHMAN

*Attesting Officer*  *Commissioner of Patents and Trademarks*